United States Patent [19]

Izumi et al.

[11] Patent Number: 4,816,933

[45] Date of Patent: *Mar. 28, 1989

[54] MAGNETIC RECORDING MEDIUM OF PARTICULAR COERCIVE FORCE, FILLING RATIO, AND PROTRUSIONS AND RECORDING/REPRODUCING METHOD THEREFOR

[75] Inventors: Toshiaki Izumi; Kiyoshi Noguchi; Hisae Shimizu, all of Saku; Misao Kohmoto, Kamagaya, all of Japan

[73] Assignee: TDK Corporation, Tokyo, Japan

[*] Notice: The portion of the term of this patent subsequent to Jul. 8, 2003 has been disclaimed.

[21] Appl. No.: 789,842

[22] Filed: Oct. 21, 1985

[30] Foreign Application Priority Data

Oct. 23, 1984 [JP] Japan ............................. 59-222685
Oct. 24, 1984 [JP] Japan ............................. 59-223349
Oct. 25, 1984 [JP] Japan ............................. 59-224563

[51] Int. Cl.$^4$ ........................... G11B 5/02; G11B 5/64
[52] U.S. Cl. ................................ 360/55; 360/131; 428/900; 427/128
[58] Field of Search ............... 428/694, 900, 143; 427/128; 360/131, 134, 55

[56] References Cited

U.S. PATENT DOCUMENTS 3,019,125 1/1962 Eggenberger et al. ............ 360/131
4,540,618 9/1985 Suzuki et al. ..................... 428/900
4,599,280 7/1986 Izumi et al. ...................... 428/694

FOREIGN PATENT DOCUMENTS 277065 8/1951 Netherlands ..................... 360/131

Primary Examiner—Vincent P. Canney
Assistant Examiner—Kevin J. Fournier
Attorney, Agent, or Firm—Oblon, Fisher, Spivak, McClelland & Maier

[57] ABSTRACT

A magnetic recording medium is provided comprising a flexible substrate and a ferromagnetic metal thin film layer on the substrate primarily comprising cobalt. When coercive force is measured by changing the measuring direction in a plane defined by a longitudinal direction of the substrate and a direction normal to the major surface of the substrate, the following relationship is met:

$$(Hc_{max} - Hc_{min})/Hc(O) \leq 0.9$$

where $Hc_{max}$ is the maximum of the coercive force, $Hc_{min}$ is the minimum of the coercive force, and $Hc(O)$ is a coercive force in the longitudinal direction of the substrate. The medium has in average at least $10^5/a^2$ protrusions per square millimeter of the surface, the protrusions having a height of 30 to 300 Å, where a is the distance as expressed in $\mu m$ of a gap in a magnetic head across which the medium is passed for recording and reproducing operation. The filling ratio of the ferromagnetic metal thin film layer is at least 0.7.

50 Claims, 1 Drawing Sheet

MAGNETIC RECORDING MEDIUM OF PARTICULAR COERCIVE FORCE, FILLING RATIO, AND PROTRUSIONS AND RECORDING/REPRODUCING METHOD THEREFOR

CROSS REFERENCE TO RELATED APPLICATION

Reference is made to copending application Ser. No. 603,668 by IZUMI et al., for Magnetic Recording Medium, filed Apr. 25, 1984, and assigned to the same assignee as the present invention now U.S. Pat. No. 4,599,280, granted July 8, 1986.

BACKGROUND OF THE INVENTION

This invention relates to magnetic recording media, and more particularly, to magnetic recording media of metal thin film type, and a method for conducting recording/reproducing operation in such media.

Among magnetic recording media for use in video, audio and other applications, active research and development works have been made on magnetic recording media, usually magnetic tapes having a magnetic layer in the form of a continuous thin film because of the compactness of a roll of tape.

The preferred magnetic layers for such continuous metal film type media are deposited films of Co, Co-Ni, and similar systems formed by the so-called oblique incidence evaporation process in which cobalt and optional elements are evaporated in vacuum and directed at a given angle with respect to the normal to the substrate because such evaporated films exhibit superior characteristics. These media should have a flat surface because of remarkable deterioration of their properties due to a spacing loss. However, as the surface becomes flatter, the friction becomes greater adversely affecting head contact and transport movement.

Usually, the metal thin film type media have a magnetic layer as thin as 0.05 to 0.5 $\mu$m so that the surface property of the media depends on the surface property of the substrate. For example, Japanese Patent Application Kokai No. 53-116115 discloses the provision of gently sloping protrusions in the form of creases or wrinkles on the substrate surface. Also, Japanese Patent Application Kokai Nos. 58-68227 and 58-100221 disclose the location of fine particles on the substrate surface, resulting in surface irregularities observable under an optical microscope with a magnifying power of 50 to 400 and actually measureable for height by means of a probe surface roughness meter. These media are, however, still insufficient in physical properties such as dynamic friction, runnability (the durability of tape which travels in frictional contact with rigid members in a recording machine), and moving stability as well as in electromagnetic properties.

Further, Japanese Patent Publication No. 39-25246 discloses the application of an organic lubricant on the surface of a ferromagentic metal thin film layer as a topcoat layer for the purpose of reducing dynamic friction. The use of lubricant has the actually undesirable problem that it tends to adhere to the associated head to eventually block the head gap.

On the other hand, the ferromagnetic metal thin film layers on substrates are formed by the oblique incidence evaporation process as a coalescence of columnar crystals which extend at an angle with respect to the normal to the major surface of the substrate and have a longitudinal diameter extending throughout the thickness of the magnetic thin layer. Cobalt and optional metals such as nickel and chromium form columnar structure particles themselves while oxygen, when added, is generally present on the surface of each columnar structure particle essentially in the form of oxides. These magnetic thin layers, however, undesirably develop a considerable difference in input and output characteristics depending on whether the media are transported forward or backward because of the shape anisotropy in the longitudinal direction of the substrate, that is, the direction of transport of the media.

The copending U.S. patent application Ser. No. 603,668 now U.S. Pat. No. 4,599,280, discloses a magnetic recording medium which can be reproduced With a reduced input-output difference irrespective of whether it is transported forward or backward. When coercive force is measured by changing the measuring direction in a plane defined by a longitudinal direction of the substrate and a direction normal to the major surface of the substrate, this magentic recording medium meets the following relationship:

$$(Hc_{max} - Hc_{min})/Hc(0) \leq 0.9$$

where $Hc_{max}$ is the maximum coercive force, $Hc_{min}$ is the minimum coercive force, and $Hc(0)$ is a coercive force in the longitudinal direction of the substrate. It is also disclosed that corrosion resistance is remarkably improved when the above-defined coercivity ratio is 0.6 or lower.

Even with the controlled coercive force distribution in the above-defined plane, this medium is still insufficient in runnability and still performance in still mode.

There is the need for an advanced technique for improving the surface properties of a metal thin film type magentic recording medium which can reduce the dynamic friction and input-output difference in both forward and backward directions and enhance the runnability without adversely affecting electromagnetic properties.

SUMMARY OF THE INVENTION

It is, therefore, an object of the present invention to provide an improved metal thin film type magnetic recording medium which has eliminated head adhesion and head gap blocking without adversely affecting electromagnetic properties while exhibiting satisfactory physical properties including friction, runnability and movement stability.

It is another object of the present invention to provide a magnetic recording medium which develops a minimized input-output difference irrespective of whether it is transported forward or backward while exhibiting a sufficient runnability.

It is a further object of the present invention to provide a method for conducting recording/reproducing operation on such a magnetic recording medium.

According to a first aspect of the present invention, there is provided a magnetic recording medium comprising a flexible substrate and a ferromagnetic metal thin film layer on one surface of the substrate primarily comprising cobalt, the improvement wherein when coercive force is measured by changing the measuring direction in a plane defined by a longitudinal direction of the substrate and a direction normal to the major surface of the substrate, the following relationship is met:

$$(Hc_{max}-Hc_{min})/Hc(0) \leq 0.9$$

where $Hc_{max}$ is the maximum of the coercive force, $Hc_{min}$ is the minimum of the coercive force, and $Hc(0)$ is a coercive force in the longitudinal direction of the substrate, and the filling ratio of the ferromagnetic metal thin film layer is at least 0.7.

According to a second aspect of the present invention, there is provided a magnetic recording medium comprising a flexible substrate and a ferromagnetic metal thin film layer on the substrate primarily comprising cobalt, the magnetic recording medium being used in combination with a magentic head having a gap, the improvement wherein when coercive force is measured by changing the measuring direction in a plane defined by a longitudinal direction of the substrate and a direction normal to the major surface of the substrate, the following relationship is met:

$$(Hc_{max}-Hc_{min})/Hc(0) \leq 0.9$$

where $Hc_{max}$ is the maximum of the coercive force, $Hc_{min}$ is the minimum of the coercive force, and $Hc(0)$ is a coercive force in the longitudinal direction of the substrate, and the medium has in average at least $10^5/a^2$ protrusions per square millimeter of the surface, the protrusions having a height of 30 to 300, where a is the distance of the magnetic head gap as expressed in $\mu m$.

According to a third aspect of the present invention, there is provided a magnetic recording medium comprising a flexible substrate and a ferromagnetic metal thin film layer on the substrate primarily comprising cobalt, the magnetic recording medium being used in combination with a magnetic head having a gap, the improvement wehrein when coercive force is measured by changing the measuring direction in a plane defined by a longitudinal direction of the substrate and a direction normal to the major surface of the substrate, the following relationship is met:

$$(Hc_{max}-Hc_{min})/Hc(0) \leq 0.9$$

where $Hc_{max}$ is the maximum of the coercive force, $Hc_{min}$ is the minimum of the coercive force, and $Hc(0)$ is a coercive force in the longitudinal direction of the substrate, the medium has in average at least $10^5/a^2$ protrusions per square millimeter of the surface, the protrusions having a height of 30 to 300 Å, where a is the distance of the magnetic head gap as expressed in $\mu m$, and the filling ratio of the ferromagnetic metal thin film layer is at least 0.7.

According to a fourth aspect of the present invention, there is provided a method for conducting recording-/reproducing operation on a magnetic recording medium comprising a flexible substrate and a ferromagnetic metal thin film layer on one surface of the substrate principally comprising cobalt by passing the medium across a magnetic head having a gap, characterized in that when coercive force is measured by changing the measuring direction in a plane defined by a longitudinal direction of the substrate and a direction normal to the major surface of the substrate, the magnetic recording medium meets the following relationship:

$$(Hc_{max}-Hc_{min})/Hc(0) \leq 0.9$$

where $Hc_{max}$ is the maximum of the coercive force, $Hc_{min}$ is the minimum of the coercive force, and $Hc(0)$ is a coercive force in the longitudinal direction of the substrate and the medium has in average at least $10^5/a^2$ protrusions per square millimeter of the surface, the protrusions having a height of 30 to 300 Å, where a is the distance of the magnetic head gap as expressed in $\mu m$.

According to a fifth aspect of the present invention, there is provided a method for conducting recording-/reproducing operation on a magnetic recording medium comprising a flexible substrate and a ferromagnetic metal thin film layer on one surface of the substrate principally comprising cobalt by passing the medium across a magnetic head having a gap, characterized in that when coercive force is measured by changing the measuring direction in a plane defined by a longitudinal direction of the substrate and a direction normal to the major surface of the substrate, the magnetic recording medium meets the following relationship:

$$(Hc_{max}-Hc_{min})/Hc(0) \leq 0.9$$

where $Hc_{max}$ is the maximum of the coercive force, $Hc_{min}$ is the minimum of the coercive force, and $Hc(0)$ is a coercive force in the longitudinal direction of the substrate, the medium has in average at least $10^5/a^2$ protrusions per square millimeter of the surface, the protrusions having a height of 30 to 300 Å, where a is the distance of the magnetic head gap as expressed in $\mu m$, and the filling ratio of the ferromagnetic metal thin film layer is at least 0.7.

BRIEF DESCRIPTION OF THE DRAWINGS

The above and other objects, features, and advantages of the present invention will be more fully understood by reading the following description when taken in conjunction with the accompanying drawings, in which.

It should be noted that the drawings are not drawn to scale and the components are disproportionately depicted for purposes of illustration.

DETAILED DESCRIPTION OF THE INVENTION

Figure 1:
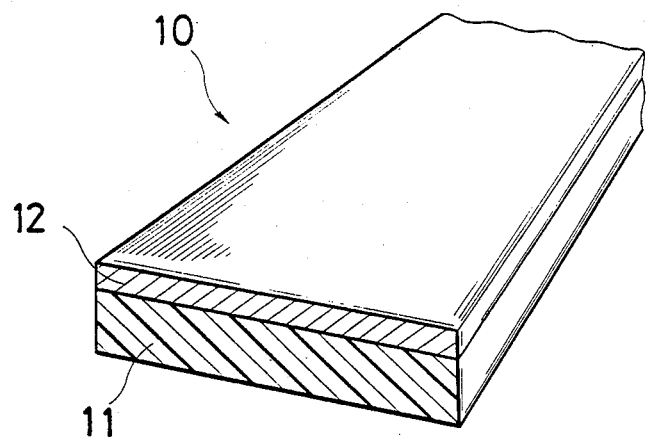
FIG. 1 is a partially cut-away, perspective view of the magnetic recording medium of the present invention.

Referring to FIG. 1, there is illustrated a magnetic recording medium generally designated at 10 according to the present invention. The magnetic recording medium 10 includes a substrate 11 having opposed major surfaces and a ferromagnetic metal thin film layer 12 formed on one major surface of substrate 11. A topcoat layer on the surface of ferromagnetic metal thin film layer 12 and a backcoat layer on the other major surface of substrate 11 may also be formed from any well-known composition, although neither the topcoat nor the backcoat layer is critical to the present invention.

Figure 2:
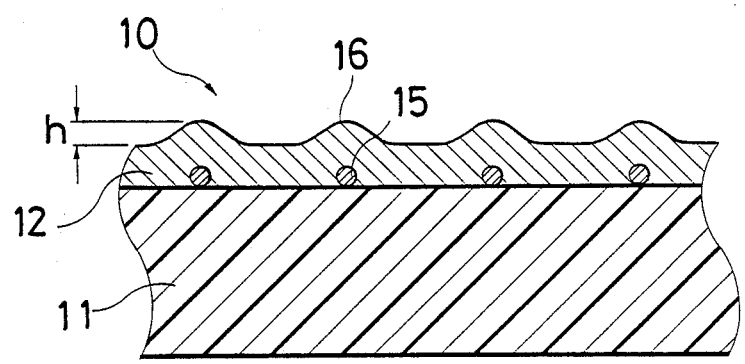
FIG. 2 is a cross-sectional view of a magnetic recording medium, according to one embodiment of the present invention.

FIG. 2 illustrates a magnetic recording medium 10 having randomly distributed protrusions or bosses 16 on the surface. These elements will be described in more detail hereinafter.

Substrate

The substrates on which the ferromagnetic metal thin film layer is formed are not particularly limited as long as they are non-magnetic. Particularly preferred are flexible substrates, especially, of resins, for example, polyesters such as polyethylene terephthalate and polyimides. They are not limited in shape, size, and thickness as long as they meet the intended application. Preferably, the substrates have a thickness of about 5 to 20 μm.

Protrusion

Fine protrusions or bosses 16 as shown in FIG. 2 may be provided in one preferred embodiment of the present invention. The protrusions have a height h of 30 to 300 Å, and more particularly, 50 to 250 Å. The protrusions have such dimensions that they are not observable under an optical microscope or measureable by a probe type surface roughness meter, but can only be observable under a scanning electron microscope. Larger protrusions in excess of 300 Å which are observable under an optical microscope are not desirable because of deterioration in electromagnetic properties and movement stability. Smaller protrusions of lower than 30 Å are not effective in improving physical properties.

Figure 3:
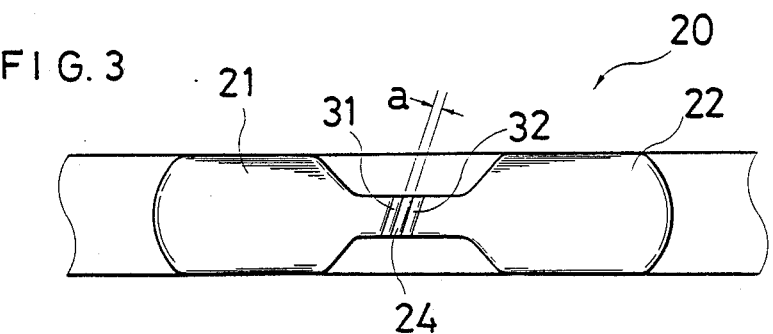
FIG. 3 is an elevation of one example of a magnetic head used in the method of the present invention.

The protrusions should be distributed on the surface of the magnetic recording medium at an average population of at least $10^5/a^2$, and more preferably $2 \times 10^6/a^2$ to $1 \times 10^9/a^2$ per square millimeter of the surface. A magnetic head 20 with which the magnetic recording medium of the present invention is used is provided with a gap 24 having a distance a (as expressed in micrometer) as shown in FIG. 3. The gap distance a usually ranges from 0.1 μm to 0.5 μm, and more preferably, from 0.1 μm to 0.4 μm. At protrusion populations of less than $10^5/a^2/mm^2$, and more particularly less than $2 \times 10^6/a^2/mm^2$, there result increased noise, deteriorated still performance, and other disadvantages, which are undesirable in practical applications. Higher protrusion populations of more than $10^9/a^2/mm^2$ are rather less effective in improving physical properties.

The protrusions 16 may generally be provided by placing submicron particles 15 on the surface of the substrate as clearly shown in FIG. 2. The submicron particles used herein have a particle size of 30 to 300 Å, and more preferably 50 to 250 Å. Submicron protrusions are then formed on the surface of the magentic layer of the magnetic recording medium which conform to the submicron particles on the substrate surface in shape and size.

The submicron particles used in the practice of the present invention are those generally known as colloidal particles. Examples of the particles which can be used herein include $SiO_2$ (colloidal silica), $Al_2O_3$ (alumina sol), MgO, $TiO_2$, ZnO, $Fe_2O_3$, zirconia, CdO, NiO, $CaWO_4$, $CaCO_3$, $BaCO_3$, $CoCO_3$, $BaTiO_3$, Ti (titanium black), Au, Ag, Cu, Ni, Fe, various hydrosols, and resinous particles. Inorganic particles are preferred among others.

The submicron particles may be placed on the substrate surface, for example, by dispersing them in a suitable solvent to form a dispersion, and applying the dispersion to the substrate followed by drying. Any aqueous emulsion containing a resinous component may also be added to the particle dispersion before it is applied to the substrate. The addition of a resinous component allows gently-sloping protrusions to form in conformity to the particles although it is not critical in the present invention.

Alternatively, the submicron particles may be contained in the topcoat layer to provide protrusions rather than the placement of particles on the substrate surface.

Magnetic layer

The magnetic recording medium of the present invention has a magnetic layer on a substrate. The magnetic layer is of continuous ferromagnetic metal thin film type coextending over the substrate and is generally based on cobalt. The magnetic layer may be formed from any well-known composition, for example, Co alone, Co-Ni, Co-Cr, Co-Ti, Co-Mo, Co-V, Co-W, Co-Re, Co-Ru, Co-Mn, Co-Fe, Fe alone, or the like by any suitable process, for example, evaporation and ion plating. In preferred embodiments of the present invention, the magnetic layer may preferably consist essentially of cobalt; coablt and nickel; cobalt and oxygen; cobalt, oxygen and nickel and/or chromium. That is, the magnetic layer may consist essentially of cobalt alone or a mixture of cobalt with nickel and/or oxygen.

Where the layer consists essentially of cobalt and nickel, the weight ratio of Co/Ni may preferably be at east about 1.5.

Better results are obtained when the ferromagnetic metal thin film layer contains chromium in addition to cobalt, or cobalt and nickel. The presence of chromium contributes to further improvements in electromagnetic characteristics, output level, signal-to-noise (S/N) ratio, and film strength. In this case, the weight ratio of Cr/Co (when nickel free) or Cr/(Co +Ni) is preferably in the range of about 0.001 to 0.1, and more preferably about 0.005 to 0.05.

The magnetic layer may further contain oxygen in addition to cobalt or cobalt and nickel and optionally chromium. The presence of oxygen contributes to further improvements in electromagnetic characteristics and runnability. In this case, the atomic ratio of 0/Co (when nickel free) or 0/(Co +Ni) is preferably not more than about 0.5, and more preferably from about 0.15 to 0.45.

On the surface of the ferromagnetic metal thin film layer, oxygen forms oxides with ferromagnetic metals Co and Ni. In Auger spectroscopy, peaks indicative of oxides appear in a surface layer, particularly in a surface layer from the surface to a depth of 50 to 500 Å, more preferably 50 to 200 Å. This oxide layer has an oxygen content of the order of 0.5 to 1.0 in atomic ratio. No particular limit is imposed on the concentration gradient of oxygen in the ferromagnetic metal thin film layer.

The ferromagnetic metal thin film layer may further contain trace elements, particularly transition metal elements, for example, Fe, Mn, V, Zr, Nb, Ta, Ti, Zn, Mo, W, Cu, etc.

The ferromagnetic metal thin film layer preferably consists of a coalescence of Co base particles of columnar structure oriented oblique to the normal to the substrate. More specifically, the axis of particles of columnar structure is preferably oriented at an angle of about 10 to 70 degrees, especially 20 to 60 degrees with respect to the normal to the major surface of the substrate. Each columnar particle generally extends throughout the thickness of the thin film layer and has a minor diameter of the order of 50 to 500 Å. Cobalt and optional metals such as nickel and chromium form the columnar crystal particles themselves while oxygen, when added, is generally present on the surface of each columnar crystal particle in the surface layer essentially in the form of oxides. The ferromagnetic metal thin film layer generally has a thickness of about 0.05 to 0.5 $\mu$m, and preferably about 0.07 to 0.3 $\mu$m.

When the coercive force of the magnetic recording medium fabricated as will be described later is measured by changing the measuring direction in a plane defined by a longitudinal direction of the substrate and a direction normal to the major surface of the substrate, $Hc_{max}$, $Hc_{min}$, and $Hc(0)$ must satisfy the following relationship:

$$(Hc_{max} - Hc_{min})/Hc(0) \leq 0.9$$

At ratios exceeding 0.9, the magnetic recording media are not commercially acceptable because an input-output difference as high as 2 dB or more is developed when the direction of transport of the medium is reversed.

When the above-defined ratio is 0.6 or lower, the input-output difference is very small in both forward and backward directions and corrosion resistance is also improved. When the ratio is 0.4 or lower, the input-output difference becomes extremely small in both forward and backward directions and corrosion resistanace is remarkably improved.

The filling ratio of the ferromagnetic metal thin film layer may preferably be at least 0.7. The term filling ratio used herein is $\rho/\rho_B$, that is, the average actual density $\rho$ of the ferromagnetic metal thin film layer divided by the true density $\rho_B$ of the ferromagnetic metal thin film layer.

The average density $\rho$ of the ferromagnetic metal thin film layer is calculated by actually measuring the weight and the volume per unit area thereof. The weight per unit area of the ferromagnetic metal thin film layer is the difference in dry weight between a tape sample and its substrate alone. The volume of the ferromagnetic metal thin film layer is calculated by measuring the thickness thereof using a step meter, film thickness gauge, or electron photomicrograph.

The true density $\rho_B$ is the theoretical density of the density of a homogeneous ingot of an alloy having the same composition as the ferromagnetic metal thin film layer. This is given by directly measuring the density of an ingot.

The average actual density p is then divided by the true density $\rho_B$ to give the filling ratio $\rho/\rho_B$.

The densities $\rho$ and $\rho_B$ of the ferromagnetic metal thin film layer may also be measured by X-ray fluorometry, Auger electron spectroscopy, or electron spectroscopy for chemical analysis (ESCA) wherein the counts of the constituent elements are determined. Since the ferromagnetic metal thin film layer prepared by the oblique incidence evaporation process has a density gradient in a thickness direction, the counts of the constituent elements are determined in X-ray fluorometry, for example, while etching the ferromagnetic metal thin film layer by a dry process such as ion milling (ion etching).

The counts are then averaged throughout the thickness and divided by the count of an ingot of an alloy having the same composition as the ferromagnetic metal thin film layer. The filling ratio $\rho/\rho_B$ is thus determined.

The filling ratio $\rho/\rho_B$ should be at least 0.7. Filling ratios $\rho/\rho_B$ of less than 0.7 result in reduced runnability and still life. Better results are obtained when the ratio is 0.75 or higher, and especially 0.8 or higher.

The ferromagnetic metal thin film layer may preferably have a gradient filling ratio $\rho/\rho_B$ in a thickness direction. More illustratively, a change in the despositon conditions alters the density distribution in a thickness direction of the ferromagnetic metal thin film layer, with which the runnability of the resulting recording medium varies.

The ferromagnetic metal thin film layer may have a higher average density or filling ratio ($\rho/\rho_B$) on its side remote from the substrate than on its side adjacent to the substrate.

When the ferromagnetic metal thin film layer is divided into three equal portions in a thickness direction, the average density p or filling ratio $\rho/\rho_B$ of the upper third remote from the substrate is higher than that of the lower third adjacent to the substrate by a factor of at least 1.5, preferably from 1.5 to 3.0, and more preferably, from 1.5 to 2.5. The runnability or the durability of the resulting magnetic recording medium is then remarkably increased. Factors of more than 3.0 result in deteriorated head contact and fluctuating output.

The average density of the respective portions of the ferromagnetic metal thin film layer may be determined from the characteristic X-ray intensity of constituent elements observed in ESCA or similar analysis and the time required for etching with argon or the like.

The ferromagnetic metal thin film layer may be formed on the substrate either directly or via an undercoat layer of the well-known type. Further, the ferromagnetic metal thin film layer is generally formed as a single layer, but in some cases, it may be made up from a plurality of laminated sub-layers with or without an intermediate non-magnetic metal thin film layer interposed therebetween. Also, the magnetic layer may be provided with a topcoat of any well-known composition.

The magnetic thin layer is preferably formed by any suitable deposition process, for example, evaporation and ion plating, with the so-called oblique incidence evaporation process being most preferred. The oblique incidence evaporation process may be any of well-known techniques preferably using an electron beam gun while the minimum incident angle is preferably at least 20 degrees with respect to the normal to the substrate. Incident angles of less than 20 degrees result in inferior electromagnetic characteristics.

In carrying out evaporation, a cylindrical can is generally used to feed the substrate. A mask is properly disposed between the evaporation source and that portion of the substrate in contact with the can such that the material is deposited to the substrate at an incident angle of 20 to 90 degrees with respect to the normal to the major surface of the substrate. The incident angle is preferably reduced as the magnetic layer is formed.

To achieve the angular dependency of coercive force as defined above, the evaporation apparatus may be properly arranged and controlled, for example, by placing a plurality of hearths or crucibles in a direction perpendicular to the feed direction of the substrate, that is, the width direction of the substrate and adjusting the rates of evaporation of the hearths, usually higher rates from lateral hearths than from the central one.

Alternatively, the ferromagnetic metal thin film layer may be prepared by placing an elongated evaporation source or hearth in an evaporation apparatus to extend in a direction transverse to the feed direction of the substrate, and controlling the rates of evaporation from a plurality of transversely spaced-apart points in the evaporation source such that the resulting magnetic thin layer may meet the coercivity relationship. At least three evaporation points are created in the transverse direction by directing beams to the source material, with one at the widthwise center of the substrate, and the rate of evaporation from the lateral points is higher than that from the central point. Preferably, the ratio of the rate of evaporation from the lateral point to that from the central point ranges from 2/1 to 5/1. If the ratio of the rate of evaporation from the lateral point to that from the central point ranges from 1/0 to 5/1, the thus deposited ferromagnetic metal thin film layer may be further heat treated.

To adjust the filling ratio $\rho/\rho_B$ and the vertical distribution thereof within the above-defined ranges, it is required to reduce the minimum incident angle to a certain degree and to control the rates of evaporation from the hearths in a width direction of the substrate as described above. Those skilled in the art will readily select suitable conditions without undue experimentation.

The remaining evaporation conditions are not particularly limited. The evaporation atmosphere may be an inert atmosphere of argon, helium, vacuum or the like as usually employed and have a pressure of about $10^{-5}$ to $10^0$ Pa. Evaporation distance, substrate feed direction, the structure and arrangement of the can and mask, and other factors may be selected from well-known conditions. Oxygen is preferably contained in the evaporation atmosphere to improve electromagnetic characteristics and corrosion resistance. In addition, oxygen may be introduced into the magnetic thin layer at any desired point during evaporation by a variety of techniques. Also, a variety of oxidizing treatments may be carried out on the magnetic layer at the end of formation of the magnetic layer.

A heat treatment may also be carried out at the end of formation of the magnetic layer to obtain better results.

Magnetic head

The magnetic recording medium of the present invention may be operated in combination with a variety of magnetic heads. It is preferred that at least a gap-defining edge portion of the magnetic head be of a magnetic metal material. It is possible to form a core entirely of a ferromagnetic metal material although a part of the core including a gap-defining edge portion may be formed of a ferromagnetic metal material.

FIG. 3 schematically shows a magnetic head generally designated at 20 as comprising core halves 21 and 22 formed of a ferromagnetic material such as ferrite. The core halves 21 and 22 are metallized at their gap-defining edge portions with ferromagnetic metal material layers 31 and 32 of about 1 to 5 $\mu$m thick by sputtering or any suitable metallizing techniques. The core halves 21 and 22 are mated so as to define a gap 24 therebetween which is filled with glass or dielectric material and has a distance A. This configuration, although the figure is not drawn to exact proportion and shape, provides improved electromagnetic properties and ensures smooth tape passage thereacross without head adhesion or clogging. Of course, the shape and structure of the head is well known.

In the practice of the present invention, it is desirable that the head gap 24 has a distance a of 0.1 to 0.5 $\mu$m, and preferably 0.1 to 0.4 $\mu$m, and a track width of 10 to 50 $\mu$m, and preferably 10 to 20 $\mu$m.

The ferromagnetic metal materials used in the fabrication of the magnetic head may be selected from a variety of such materials including thin films and thin plates of amorphous magnetic metals, Sendust, hard Permalloy, Permalloy, etc. Among them, particularly preferred are amorphous magnetic Co-based alloys because they experience little head adhesion or clogging and have excellent electromagnetic properties. Preferred are amorphous magnetic alloys comprising 70 to 95 atom % of Co and 5 to 20 atom % of a vitrifying element(s) such as Zr, Nb, Ta, Hf, rare earth elements, Si, B, P, C, Al, etc., with the Zr and/or Nb being most preferred. Also preferred are alloys comprising 65 to 85 atom % of Co and 15 to 35 atom % of Si and/or B as a vitrifying element. The latter alloys may further contain less than 10 atom % of Fe, less than 25 atom % of Ni, less than 20 atom % (in total) of at least one member of Cr, Ti, Ru, W, Mo, Ti, Mn, etc.

The amorphous magnetic alloys may be formed into core halves or gap-defining segments by sputtering or high speed quenching.

Recording/reproducing operation may be performed on the magnetic recording medium of the present invention by means of the above-mentioned magnetic head in accordance with any well-known video recording/reproducing systems including the so-called VHS, Beta, 8-mm video and U-standard systems.

The magnetic recording medium and recording/reproducing method according to the present invention is very useful in video, audio, computer and other applications, and has a number of benefits.

The magnetic recording medium develops a minimal input-output difference irrespective of whether it is transported forward or backward. The magnetic recording medium exhibits improved corrosion resistance and experiences little deterioration in performance. The magnetic recording medium also exhibits sufficiently reduced dynamic friction to provide stable movement.

Runnability is outstandingly improved so that the dynamic friction increases little after repeated travel cycles in a recording/reproducing equipment. The medium tolerates an increased number of recording/reproducing operations and offers improved still characteristics (characteristics in the still mode reproduction).

Improved stability ensures that the medium can be stored and operated in severely varying environments from high-temperature high-humidity to low-temperature low-humidity environments.

Reproduction output is little affected by a spacing loss and contains less noise.

The magnetic recording medium operated in contact with a head releases little materials which will adhere to and clog the head.

These benefits are further enhanced when the medium is used in combination with ferromagnetic metal heads, and particularly in the case of high density recording at a minimum recording wavelength of less than 1 $\mu$m.

EXAMPLES

Examples of the present invention are given below by way of illustration and not by way of limitation.

Example 1

Using cobalt alone, a Co-Ni alloy having a Co/Ni weight ratio of 4/1 and a Co-Ni-Cr alloy having a Co/Ni/Cr weight ratio of 65/30/5 as an evaporation source, a ferromagnetic metal thin film layer of 0.15 μm thick was formed on a length of polyethylene terephthalate (PET) film of 10 μm thick and 100 mm wide by the oblique incidence evaporation process. The film or substrate was continuously fed by a can such that the incident angle of the evaporated material was gradually reduced from 90 degrees with respect to the normal to the substrate as deposition proceeded. The distance between the evaporation source and the can or substrate was 200 mm. Evaporation was carried out in an atmosphere having an argon partial pressure of $5\times10^{-3}$ Pa and containing oxygen at $2\times10^{-1}$ Pa.

Three hearths containing the evaporation source were used, one below the center of the substrate and the remaining two being oppositely spaced 20 mm from the central hearth in the width direction of the substrate. Each hearth had a liquid metal surface area of 25 cm$^2$. Evaporation was carried out by properly controlling the evaporation rates from the three hearths. The two side hearths were set to an equal evaporation rate while the ratio of the evaporation rate from the two side hearths to that from the central hearth was changed as shown in Table 1. The minimum incident angle of the evaporated material to the substrate was changed as shown in Table 1.

The resulting webs were further subjected to a heat treatment at 85° C. for 1 hour in air.

Each sample had a ferromagnetic metal thin film layer consisting of coalesced columnar crystal particles each extending throughout the thickness of the magnetic layer and at an angle with respect to the normal to the substrate. The columnar crystal particles were at a larger angle with respect to the normal to the substrate on their side adjacent to the substrate than on their top surface side.

The average concentration of oxygen in the ferromagnetic metal thin film layer was from 18 to 20% as expressed by its atomic ratio to Co and Ni, that is, $0/(Co+Ni)\times100$.

The resulting web was cut into a plurality of tapes having a width of ½ inches. A tape cut from a central portion of the original web was subjected to various measurements.

The values of $(Hc_{max}-Hc_{min})/Hc(0)$ of the thus prepared samples are shown in Table 1.

The resulting tape samples and the substrate used were dried an weighed while the thickness of the ferromagnetic metal thin film layer was measured. The average density was calculated by dividing the difference in dry weight between the tape sample and the substrate alone by the volume of the ferromagnetic metal thin film layer. The true density $\rho_B$ was determined by measuring the density of a homogeneous alloy ingot having the same composition as the ferromagnetic metal thin film layer. The filling ratio $\rho/\rho_B$ of the sample is calculated and shown in Table 1.

The filling ratio $\rho/\rho_B$ of the upper one third portion remote from the substrate was divided by the filling ratio $\rho/\rho_B$ of the lower one third portion adjacent to the substrate to obtain the quotient x, which is shown in Table 1. These ratios were measured by ESCA while the ferromagnetic metal thin film layer was etched with argon.

The results are shown in Table 1.

The measurement of various properties is described below.

Coercivity relationship

Magnetic measurement was carried out using a sample vibrating magnetometer (VSM 5S-15 manufacture by Toei Kogyo K.K.) with a maximum magnetic field of 10 kG applied. A 6 mm×6 mm piece was cut from a sample. The magnetic field was rotated in a plane containing a direction perpendicular to a direction parallel to the surface.

Output difference in forward and reverse directions

A commercial VHS video deck was loaded with a tape. With inputs at 4.5 MHz, outputs were measured in both the forward and reverse transport directions to determine the difference between the maximum outputs in both the directions.

Corrosion resistance

The tapes were allowed to stand for 7 days at 60° C. and relative humidity of 90%. A percent reduction in magnetic flux quantity ($\Delta\phi m/\phi m$, %) per square meter was measured.

Still life

A commercial 8-mm video deck (CCD V8 manufactured by Sony Corporation) was loaded with a tape. Signals were recorded in tape at 5 MHz and reproduced in still mode at 20° C. and a relative humidity of 60%. The time (min.) required for the reproduced output to be reduced by one-half was measured. A continuous operation in still mode in excess of 10 minutes is acceptable.

Runnability

A sample tape was driven over 50 passes in the VTR equipment. The magnitude of signal output of the sample was measured at 4 MHz both at the initial and after 50 passes. The output reduction after 50 passes was expressed in dB.

TABLE 1

| Sample No. | Composition | Minimum incident angle | Evaporation rate ratio, side/center | $HC_{max}-HC_{min}$ Hc(O) | Filling ratio | x | Output difference, dB | $\Delta\phi$ m/$\Phi$ m, % | Still life, min. | Runnability, dB |
|---|---|---|---|---|---|---|---|---|---|---|
| 101* | Co/Ni/O | 40 | 0/1 | 1.02 | 0.66 | 1.52 | 0.8 | 20.5 | >10 | 12 |
| 102* | Co/Ni/O | 40 | 1/0 | 0.68 | 0.45 | 1.28 | 0.3 | 2.5 | <1 | 20 |
| 103* | Co/Ni/O | 40 | 5/1 | 0.63 | 0.52 | 1.36 | 0.2 | 0.4 | <1 | 10 |
| 104* | Co/Ni/O | 40 | 3/1 | 0.44 | 0.54 | 1.39 | 0.1 | 0.1 | <1 | 8 |
| 105* | Co/Ni/O | 40 | 2/1 | 0.31 | 0.57 | 1.41 | 0.1 | 0.1 | <1 | 5 |
| 106 | Co/Ni/O | 30 | 5/1 | 0.58 | 0.73 | 1.53 | 0.2 | 0.2 | >10 | 1 |
| 107 | Co/Ni/O | 30 | 2/1 | 0.29 | 0.79 | 1.80 | 0 | 0.1 | >10 | 1 |

TABLE 1-continued

| Sample No. | Composition | Minimum incident angle | Evaporation rate ratio, side/center | $\frac{Hc_{max}-Hc_{min}}{Hc(0)}$ | Filling ratio | x | Output difference, dB | $\Delta\phi$ m/$\Phi$ m % | Still life, min. | Runnability, dB |
|---|---|---|---|---|---|---|---|---|---|---|
| 108 | Co/Ni/O | 20 | 5/1 | 0.56 | 0.86 | 1.61 | 0.2 | 0.1 | >10 | 1 |
| 109 | Co/Ni/O | 20 | 2/1 | 0.30 | 0.89 | 2.45 | 0 | 0.1 | >10 | 0 |
| 110* | Co/Ni/Cr/O | 40 | 3/1 | 0.38 | 0.52 | 1.26 | 0.1 | 0.1 | <1 | 5 |
| 111 | Co/Ni/Cr/O | 20 | 3/1 | 0.41 | 0.88 | 2.10 | 0 | 0.1 | >10 | 0 |

*Examples having a filling ratio outside the specified range of the present invention.

EXAMPLE 2

Colloidal silica was applied onto a substantially particulate-free smooth polyester film of 12 μm thick. There was obtained a substrate having submicron particles or protrusions distributed thereon at a density of about $10^7$/mm². The protrusions were as high as about 150 Å.

A ferromagnetic metal thin film layer was deposited on the substrate by the same evaporation process as described for the ferromagnetic metal thin film layer of Example 1 except that the incident angle of the evaporated material was gradually reduced from 90 degrees to 40 degrees with respect to the normal to the substrate as deposition proceeded. The samples in this example were not subjected to a heat treatment.

Evaporation was carried out in both an oxygen-containing atmosphere and an oxygen-free atmosphere. The average concentration of oxygen in the ferromagnetic metal thin film layer was from 18 to 20% as expressed by its atomic ratio to Co and Ni, that is, O/(Co +Ni) ×100. It was approximately 1% when evaporation was carried out in the substantial absence of oxygen.

The resulting web was cut into a plurality of tapes having a width of ½ inches. A tape cut from the central portion of the original web was subjected to various measurements. The procedure of each measurement is the same as in the preceding example.

The magnetic head used in examining the tape was of the type shown in FIG. 3 and having a gap distance a of 0.25 μm and a track width of 20 μm. The core halves 21, 22 were formed of ferrite, gap-defining edge portions 31, 32 were amorphous layers of Co 0.8/Ni 0.1/Zr 0.1 (atomic ratio percent) formed by sputtering to a thickness of 3 μm, and the gap filler was glass. For the head of this size, the minimum protrusion distribution population $10^5/a^2$ is calculated to be $1.6 \times 10^6$.

The results are shown in Table 2.

TABLE 2

| Sample No. | Composition | $O_2$ in atmosphere | Evaporation rate ratio, side/center | $\frac{Hc_{max}-Hc_{min}}{Hc(0)}$ | Output difference, dB |
|---|---|---|---|---|---|
| 201* | Co/Ni | no | 0/1 | 2.2 | 6.2 |
| 202* | Co/Ni/O | present | 0/1 | 1.8 | 5.0 |
| 203* | Co/Ni/O | present | 1/0 | 1.2 | 2.2 |
| 204 | Co/Ni/O | present | 2/1 | 0.8 | 0.7 |
| 205 | Co/Ni/O | present | 3/1 | 0.7 | 0.3 |
| 206* | Co | no | 3/1 | 1.4 | 2.6 |
| 207 | Co/O | present | 3/1 | 0.8 | 0.5 |
| 208* | Co/Ni/Cr | no | 3/1 | 1.2 | 3.1 |
| 209 | Co/Ni/Cr/O | present | 3/1 | 0.9 | 0.6 |
| 210 | Co/Ni/Cr/O | present | 4/1 | 0.6 | 0.2 |

*Examples having a ratio of $(Hc_{max}-Hc_{min})/Hc(0)$ outside the specified range of the present invention.

EXAMPLE 3

The procedure of Example 2 was repeated except that the samples obtained were further subjected to a heat treatment at 85° C. for 1 hour in air.

The thus obtained samples were subjected to various measurements. The procedure of each measurement is the same as in Example 1. The results are shown in Table 3.

TABLE 3

| Sample No. | Composition | $O_2$ in atmosphere | Evaporation rate ratio, side/center | $\frac{Hc_{max}-Hc_{min}}{Hc(0)}$ | Output difference, dB | $\Delta\phi$ m/$\phi$ m, % |
|---|---|---|---|---|---|---|
| 301* | Co/Ni | no | 0/1 | 1.2 | 2.4 | 36.5 |
| 302* | Co/Ni/O | present | 0/1 | 1.0 | 0.8 | 20.5 |
| 303 | Co/Ni/O | present | 1/0 | 0.7 | 0.2 | 2.5 |
| 304 | Co/Ni/O | present | 5/1 | 0.5 | 0.2 | 0.4 |
| 305 | Co/Ni/O | present | 3/1 | 0.4 | 0.1 | 0.1 |
| 306 | Co/Ni/O | present | 2/1 | 0.3 | 0.1 | 0.1 |
| 307 | Co | no | 3/1 | 0.7 | 0.4 | 9.2 |
| 308 | Co/O | present | 3/1 | 0.4 | 0.1 | 0.2 |
| 309 | Co/Ni/Cr | no | 3/1 | 0.7 | 0.3 | 2.5 |
| 310 | Co/Ni/Cr/O | present | 3/1 | 0.4 | 0.1 | 0.1 |

*Examples having a ratio of $(Hc_{max}-Hc_{min})/Hc(0)$ outside the specified range of the present invention.

EXAMPLE 4

Colloidal silica was applied onto a substantially particulate-free smooth polyester film of 12 μm thick to obtain a substrate having submicron particles or protrusions distributed thereon. The height and the population of the protrusions are shown in Table 4.

The protrusions according to the present invention had such dimensions that they were not observable under an optical microscope or measurable by a probe type surface roughness meter but could only be observable under a scanning electron microscope. The dimensions of the protrusions on the substrate corresponded to the dimensions of the colloidal silica.

The ferromagnetic metal thin film layer of a Co-Ni alloy having a Co/Ni weight ratio of 4/1 was deposited on the substrate by the same process as in Example 2. The ratio of the rate of evaporation from the lateral source to that from the central source was kept at 3/1.

Certain properties of magnetic recording tapes are given in relation to the height and population of protrusions on the magnetic layer surface in Table 4.

Experiments were carried out using signals having a minimum recording wavelength of 0.7 μm. The magnetic heads used were the same amorphous head as used in Example 2 and a ferrite head of the same shape and size. It was found that the output difference of the samples was less than 0.5 dB and that the coercivity relationship was 0.7.

Protrusion

Protrusions were observed under a scanning and a transmissive electron microscope.

Output

Signals are recorded and reproduced at a frequency of 5 MHz to determine an S/N ratio (relative value). To this end, a commercially available VHS type video tape recorder is modified so as to make possible measurement up to 5 MHz.

Noise

Noise expressed in dB was measured at 4 MHz while the reproduced output is measured.

Surface condition after 50 passes

A sample tape was driven over 50 passes in the VTR equipment. The tape was then observed under an optical microscope. Symbols used in Table 4 have the following meanings.

| Symbol | Surface condition |
|---|---|
| O | no change |
| Δ | magnetic layer surface abraded |
| X | magnetic layer peeled off |

TABLE 4

| Sample No. | Protrution Height, Å | Protrution Density,/mm² | Reproducing output, dB | Noise, dB | Still life, min. | Surface condition after 50 passes | Head type |
|---|---|---|---|---|---|---|---|
| 401 | 50 | $2 \times 10^6$ | +0.2 | 0 | >10 | O | amorphous |
| 402 | 50 | $5 \times 10^7$ | −0.2 | +0.1 | >10 | O | amorphous |
| 403 | 100 | $4 \times 10^6$ | −0.2 | +0.1 | >10 | O | amorphous |
| 404 | 100 | $5 \times 10^7$ | −0.3 | +0.1 | >10 | O | amorphous |
| 405 | 100 | $2 \times 10^9$ | −0.5 | +0.1 | >10 | O | amorphous |
| 406 | 200 | $4 \times 10^6$ | −0.5 | 0 | >10 | O | amorphous |
| 407 | 200 | $4 \times 10^8$ | −0.7 | +0.1 | >10 | O | amorphous |
| 408 | 200 | $1 \times 10^{10}$ | −1.0 | +0.2 | >10 | O | amorphous |
| 409 | 250 | $2 \times 10^6$ | −0.3 | −0.1 | >10 | O | amorphous |
| 410 | 250 | $3 \times 10^7$ | −0.5 | +0.1 | >10 | O | amorphous |
| 411 | 250 | $3 \times 10^9$ | −0.8 | +0.2 | 9 | O | amorphous |
| 412* | — | — | 0 | 0 | 2 | X | amorphous |
| 413** | 100 | $5 \times 10^5$ | −0.2 | +1.5 | 3 | X | amorphous |
| 414** | 100 | $1 \times 10^5$ | −0.5 | +1.5 | 3 | X | amorphous |
| 415** | 500 | $3 \times 10^7$ | −4.0 | +1.0 | 6 | Δ | amorphous |
| 416** | 1000 | $4 \times 10^6$ | −5.0 | +1.0 | 6 | Δ | amorphous |
| 417 | — | — | −2.0 | +1.0 | 2 | X | ferrite |
| 418 | 100 | $4 \times 10^8$ | −2.3 | +0.8 | 9 | Δ | ferrite |
| 419 | 250 | $5 \times 10^7$ | −2.5 | +1.0 | >10 | Δ | ferrite |
| 420 | 250 | $1 \times 10^5$ | −2.0 | +2.0 | 3 | X | ferrite |
| 421 | 250 | $1 \times 10^{10}$ | −2.5 | +1.0 | 8 | X | ferrite |
| 422 | 1000 | $3 \times 10^7$ | −7.5 | +2.5 | 5 | Δ | ferrite |

*control
**Examples having protusions with height or density outside the specified range of the present invention

EXAMPLE 5

The substrate having submicron particles or protrusions distributed thereon was prepared in the same manner as in Example 2.

A magnetic metal thin film was deposited in the same manner as for the magnetic metal thin film of Example 1. The magnetic heads used were the same amorphous head as used in Example 2.

Various properties of the resulting tapes in relation to the filling ratio and the height and density of the protrusions are shown in Table 5.

TABLE 5

| Sample No. | Composition | Minimum incident angle | Evaportion rate ratio, side/center | $\frac{Hc_{max}-Hc_{min}}{Hc(O)}$ | Filling ratio | x | Output difference, dB | Δφ m/φ m, % | Still life, min. | Runnability, dB |
|---|---|---|---|---|---|---|---|---|---|---|
| 501* | Co/Ni/O | 40 | 0/1 | 1.02 | 0.66 | 1.52 | 0.8 | 20.0 | >10 | 8 |
| 502* | Co/Ni/O | 40 | 1/0 | 0.68 | 0.46 | 1.28 | 0.3 | 2.5 | <1 | 15 |
| 503* | Co/Ni/O | 40 | 5/1 | 0.64 | 0.52 | 1.36 | 0.2 | 0.4 | <1 | 8 |
| 504* | Co/Ni/O | 40 | 3/1 | 0.44 | 0.54 | 1.37 | 0.1 | 0.1 | <1 | 6 |
| 505* | Co/Ni/O | 40 | 2/1 | 0.31 | 0.57 | 1.40 | 0.1 | 0.1 | <1 | 3 |
| 506 | Co/Ni/O | 30 | 5/1 | 0.56 | 0.73 | 1.53 | 0.2 | 0.2 | >10 | 0 |
| 507 | Co/Ni/O | 30 | 2/1 | 0.29 | 0.77 | 1.80 | 0 | 0.1 | >10 | 0 |

TABLE 5-continued

| Sample No. | Composition | Minimum incident angle | Evaportion rate ratio, side/center | $Hc_{max}-Hc_{min}$ / Hc(0) | Filling ratio | x | Output difference, dB | Δφ m/ φ m, % | Still life, min. | Runnability, dB |
|---|---|---|---|---|---|---|---|---|---|---|
| 508 | Co/Ni/O | 20 | 5/1 | 0.56 | 0.86 | 1.61 | 0.2 | 0.1 | >10 | 0 |
| 509 | Co/Ni/O | 20 | 2/1 | 0.30 | 0.89 | 2.42 | 0 | 0.1 | >10 | 0 |
| 510* | Co/Ni/Cr/O | 40 | 3/1 | 0.37 | 0.52 | 1.26 | 0.1 | 0.1 | <1 | 3 |
| 511 | Co/Ni/Cr/O | 20 | 3/1 | 0.41 | 0.87 | 2.10 | 0 | 0.1 | >10 | 0 |

*Examples having a filling ratio outside the specified range of the present invention.

All the ferromagnetic thin films in Examples were found by Auger spectroscopy to be covered with an oxide layer of 100 to 200 Å thick on their surface, except those samples in which the ferromagnetic metal thin film layer was deposited in an oxygen-free atmosphere.

Although the foregoing Examples used colloidal silica as the inorganic submicron particles, equivalent results are obtained by using other submicron particles such as alumina sol, titanium black, zirconia, and various hydrosols.

In addition, equivalent results were obtained when a magnetic head formed of an amorphous Co-Fe-Ru-Cr-Si-B alloy was used. Rather less desirable results were obtained when a Sendust head was used.

The results in Examples 1 to 5 show that the magnetic recording medium according to the present invention has improved physical properties including friction, runnability and movement stability over the conventional medium.

What is claimed is:

1. A magnetic recording medium comprising a flexible substrate and a ferromagnetic metal thin film layer on one surface of the substrate primarily comprising cobalt, the improvement wherein
when coercive force is measured by changing the measuring direction in a plane defined by a longitudinal direction of the substrate and a direction normal to the major surface of the substrate, the following relationship is met:

$$(Hc_{max}-Hc_{min})/Hc(0) \leq 0.9$$

where $Hc_{max}$ is the maximum of the coercive force, $Hc_{min}$ is the minimum of the coercive force, and Hc(0) is a coercive force in the longitudinal direction of the substrate, and
the filling ratio of the ferromagnetic metal thin film layer is at least 0.7, said filling ratio being $\rho/\rho\beta$ wherein $\rho$ is the average actual density of the ferromagnetic metal thin film layer and $\rho\beta$ is the true density of the ferromagnetic thin film layer.

2. A magnetic recording medium according to claim 1 wherein the ferromagnetic metal thin film layer consists essentially of cobalt alone or cobalt and at least one member selected from the group consisting of nickel, chromium and oxygen.

3. A magnetic recording medium according to claim 2 wherein the ferromagnetic metal thin film layer contains chromium in a weight ratio of Cr/Co or Cr/(Co+Ni) of about 0.001 to about 0.1

4. A magnetic recording medium according to claim 2 wherein the ferromagnetic metal thin film layer contains chromium in a weight ratio of Cr/Co or Cr/(Co+Ni) of about 0.001 to about 0.1.

5. A magnetic recording medium according to claim 2 wherein the ferromagnetic metal thin film layer further contains oxygen in an atomic ratio of O/Co or O/(Co+Ni) of about 0.5 or lower.

6. A magnetic recording medium according to claim 1 wherein the ferromagnetic metal thin film layer is about 0.05 to about 0.5 μm thick.

7. A magnetic recording medium according to claim 1 wherein the ferromagnetic metal thin film layer comprises coalesced columnar crystal particles which extend at an angle with respect to the normal to the major surface of the substrate.

8. A magnetic recording medium according to claim 7 wherein the columnar crystal particle is at a larger angle with respect to the normal to the major surface of the substrate on its side adjacent to the substrate than on its side remote from the substrate.

9. A magnetic recording medium according to claim 1 wherein $$(Hc_{max}-Hc_{min})/Hc(0) \leq 0.6$$

10. A magnetic recording medium according to claim 9 wherein $$(Hc_{max}-Hc_{min})/Hc(0) \leq 0.4$$

11. A magnetic recording medium according to claim 1 wherein the filling ratio of the ferromagnetic metal thin film layer is at least 0.75.

12. A magnetic recording medium according to claim 1 wherein the ferromagnetic metal thin film layer has a higher average density on its side remote from the substrate than on its side adjacent to the substrate.

13. A magnetic recording medium according to claim 12 wherein when the ferromagnetic metal thin film layer is divided into three equal portions in a thickness direction, the average density of the upper third remote from the substrate is higher than that of the lower third adjacent to the substrate by a factor of at least 1.5.

14. The magnetic recording medium of claim 1 wherein the ferromagnetic metal thin film layer is prepared by the oblique incidence evaporation process comprising the steps of:
placing an evaporation source in an evaporation apparatus to extend in a direction transverse to the feed direction of the substrate, and
controlling the rates of evaporation from a plurality of transversely spaced-apart points in the evaporation source such that the resulting magnetic thin layer may meet the coercivity relationship.

15. The magnetic recording medium of claim 14 wherein at least three evaporation points are arranged in the transverse direction with one at the widthwise center of the substrate, and the rate of evaporation from the lateral points is higher than that from the central point.

16. A magnetic recording medium comprising a flexible substrate and a ferromagnetic metal thin film layer on the substrate primarily comprising cobalt, the magnetic recording medium being used in combination with a magnetic head having a gap, the improvement wherein when coercive force is measured by changing the measuring direction in a plane defined by a longitudinal direction of the substrate and a direction normal to the major surface of the substrate, the following relationship is met:

$$(Hc_{max} - Hc_{min})/Hc(0) \leq 0.9$$

where $Hc_{max}$ is the maximum of the coercive force, $Hc_{min}$ is the minimum of the coercive force, and $Hc(0)$ is a coercive force in the longitudinal direction of the substrate, and the medium has in average at least $10^5/a^2$ protrusions per square millimeter of the surface, the protrusions having a height of 30 to 300 Å, where a is the distance of the magnetic head gap as expressed in m and is from 0.1 to 0.5 μm.

17. A magnetic recording medium according to claim 16 wherein the ferromagnetic metal thin film layer consists essentially of cobalt alone or cobalt and at least one member selected from the group consisting of nickel, chromium and oxygen.

18. A magnetic recording medium according to claim 17 wherein the ferromagnetic metal thin film layer contains nickel in a weight ratio of Co/Ni of about 1.5 or higher.

19. A magnetic recording medium according to claim 17 wherein the ferromagnetic metal thin film layer contains chromium in a weight ratio of Cr/Co or Cr/(Co+Ni) of about 0.001 to about 0.1.

20. A magnetic recording medium according to claim 17 wherein the magnetic metal thin film layer further contains oxygen in an atomic ratio of O/Co or O/(Co+Ni) of about 0.5 or lower.

21. A magnetic recording medium according to claim 16 wherein the ferromagnetic metal thin film layer is about 0.05 to about 0.5 μm thick.

22. A magnetic recording medium according to claim 16 wherein the ferromagnetic metal thin film layer comprises coalesced columnar crystal particles which extend at an angle with respect to the normal to the major surface of the substrate.

23. A magnetic recording medium according to claim 22 wherein the columnar crystal particle is at a larger angle with respect to the normal to the major surface of the substrate on its side adjacent to the substrate than on its side remote from the substrate.

24. A magnetic recording medium according to claim 16 wherein $$(Hc_{max} - Hc_{min})/Hc(0) \leq 0.6$$

25. A magnetic recording medium according to claim 24 wherein $$(Hc_{max} - Hc_{min})/Hc(0) \leq 0.4$$

26. A magnetic recording medium according to claim 16 wherein said flexible substrate is comprised of a high polymer, submicron particles having a size of 30 to 300 Å are placed on one surface of the substrate, and the ferromagentic metal thin film layer is provided on the one substrate surface with the intervening particles.

27. The magnetic recording medium of claim 16 wherein the ferromagnetic metal thin film layer is prepared by the oblique incidence evaporation process comprising the steps of:

placing an evaporation source in an evaporation apparatus to extend in a direction transverse to the feed direction of the substrate, and controlling the rates of evaporation from a plurality of transversely spaced-apart points in the evaporation source such that the resulting magnetic thin layer may meet the coercivity relationship.

28. The magnetic recording medium of claim 27 wherein at least three evaporation points are arranged in the transverse direction with one at the widthwise center of the substrate, and the rate of evaporation from the lateral points is higher than that from the central point.

29. A magnetic recording medium comprising a flexible substrate and a ferromagnetic metal thin film layer on the substrate primarily comprising cobalt, the magnetic recording medium being used in combination with a magnetic head having a gap, the improvement wherein when coercive force is measured by changing the measuring direction in a plane defined by a longitudinal direction of the substrate and a direction normal to the major surface of the substrate, the following relationship is met:

$$(Hc_{max} - Hc_{min})/Hc(0) \leq 0.9$$

where $Hc_{max}$ is the maximum of the coercive force, $Hc_{min}$ is the minimum of the coercive force, and $Hc(0)$ is a coercive force in the longitudinal direction of the substrate, the medium has in average at least $10^5/a^2$ protrusions per square millimeter of the surface, the protrusion having a height of 30 to 300 Å, wherein a is the distance of the magnetic head gap as expressed in μm, and the filling ratio of the ferromagnetic metal thin film layer is at least 0.7, said filling ratio being $\rho/\rho\beta$ wherein $\rho$ is the average actual density of the ferromagnetic metal thin film layer and $\rho\beta$ is the true density of the ferromagnetic thin film layer.

30. A magnetic recording medium according to claim 29 wherein the ferromagnetic metal thin film layer consists essentially of cobalt alone or cobalt and at least one selected from the group consisting of nickel, chromium and oxygen.

31. A magnetic recording medium according to claim 30 wherein the ferromagnetic metal thin film layer contains nickel in a weight ratio of Co/Ni of about 1.5 or higher.

32. A magnetic recording medium according to claim 30 wherein the ferromagnetic metal thin film layer contains chromium in a weight ratio of Cr/Co or Cr/(Co+Ni) of about 0.001 to about 0.1.

33. A magnetic recording medium according to claim 30 wherein the magnetic metal thin film layer further contains oxygen in an atomic ratio of O/Co or O/(Co−Ni) of about 0.5 or lower.

34. A magnetic recording medium according to claim 29 wherein the ferromagnetic metal thin film layer is about 0.05 to about 0.5 μm thick.

35. A magnetic recording medium according to claim 29 wherein the ferromagnetic metal thin film layer comprises coalesced columnar crystal particles which extend at an angle with respect to the normal to the major surface of the substrate.

36. A magnetic recording medium according to claim 35 wherein the columnar crystal particle is at a larger angle with respect to the normal to the major surface of the substrate on its side adjacent to the substrate than on its side remote from the substrate.

37. A magnetic recording medium according to claim 29 wherein $$(Hc_{max}-Hc_{min})/Hc(0) \leqq 0.6.$$

38. A magnetic recording medium according to claim 37 wherein $$(Hc_{max}-Hc_{min})/Hc(0) \leqq 0.4.$$

39. A magnetic recording medium according to claim 29 wherein the filling ratio of the ferromagnetic metal thin film layer is at least 0.75.

40. A magnetic recording medium according to claim 29 wherein the ferromagnetic metal thin film layer has a higher average density on its side remote from the substrate than on its side adjacent to the substrate.

41. A magnetic recording medium according to claim 40 wherein the ferromagnetic metal thin film layer is divided into three equal portions in a thickness direction, the average density of the upper third remote from the substrate is higher than that of the lower third adjacent to the substrate by a factor of at least 1.5.

42. A magnetic recording medium according to claim 29 wherein said flexible substrate is comprised of a high polymer, submicron particles having a size of 30 to 300 Å are placed on one surface of the substrate, and the ferromagnetic metal thin film layer is provided on the one substrate surface with the intervening particles.

43. The magnetic recording medium of claim 29 wherein the ferromagnetic metal thin film layer is prepared by the oblique incidence evaporation process comprising the steps of:
 placing an evaporation source in an evaporation apparatus to extend in a direction transverse to the feed direction of the substrate, and
 controlling the rates of evaporation from a plurality of transversely spaced-apart points in the evaporation source such that the resulting magnetic thin layer may meet the coercivity relationship.

44. The magnetic recording medium of claim 43 wherein at least three evaporation points are arranged in the transverse direction with one at the widthwise center of the substrate, and the rate of evaporation from the lateral points is higher than that from the central point.

45. A method for conducting recording/reproducing operation on a magnetic recording medium comprising a flexible substrate and a ferromagnetic metal thin film layer on one surface of the substrate principally comprising cobalt by passing the medium across a magnetic head having a gap, characterized in that
 when coercive force is measured by changing the measuring direction in a plane defined by a longitudinal direction of the substrate and a direction normal to the major surface of the substrate, the magnetic recording medium meets the following relationship:

$$(Hc_{max}-Hc_{min})/Hc(0) \leqq 0.9$$

where $Hc_{max}$ is the maximum of the coercive force, $Hc_{min}$ is the minimum of the coercive force, and $Hc(0)$ is a coercive force in the longitudinal direction of the substrate and the medium has in average at least $10^5/a^2$ protrusions per square millimeter of the surface, the protrusions having a height of 30 to 300, wherein a is the distance of the magnetic head gap as expressed in $\mu m$ and is from 0.1 to 0.5 $\mu m$.

46. A magnetic recording/reproducing method according to claim 45 wherein at least an edge portion of the magnetic head including the gap is formed of a ferromagnetic metal material.

47. A magnetic recording/reproducing method according to claim 46 wherein the ferromagnetic metal material is a magnetic amorphous cobalt base alloy.

48. A method for conducting recording/reproducing operation on a magnetic recording medium comprising a flexible substrate and a ferromagnetic metal thin film layer on one surface of the substrate principally comprising cobalt by passing the medium across a magnetic head having a gap, characterized in that
 when coercive force is measured by changing the measuring direction in a plane defined by a longitudinal direction of the substrate and a direction normal to the major surface of the substrate, the magnetic recording medium meets the following relationship:

$$(Hc_{max}-Hc_{min})/Hc(0) \leqq 0.9$$

where $Hc_{max}$ is the maximum of the coercive force, $Hc_{min}$ is the minimum of the coercive force, and $Hc(0)$ is a coercive force in the longitudinal direction of the substrate,
 the medium has in average at least $10^5/a^2$ protrusions per square millimeter of the surface, the protrusions having a height of 30 to 300 Å, where a is the distance of the magnetic head gap as expressed in $\mu m$ and is from 0.1 to 0.5 $\mu m$, and
 the filling ratio of the ferromagnetic metal thin film layer is at least 0.7, said filling ratio being wherein $\mu$ is the average actual density of the ferromagnetic metal thin film layer and $\mu$ is the true density of the ferromagnetic thin film layer.

49. A magnetic recording/reproducing method according to claim 48 wherein at least an edge portion of the magnetic head including the gap is formed of a ferromagnetic metal material.

50. A magnetic recording/reproducing method according to claim 49 wherein the ferromagnetic metal material is a magnetic amorphous cobalt base alloy.

* * * * *

UNITED STATES PATENT AND TRADEMARK OFFICE
CERTIFICATE OF CORRECTION

PATENT NO. : 4,816,933

DATED : MARCH 28, 1989

INVENTOR(S) : IZUMI ET AL

It is certified that error appears in the above-identified patent and that said Letters Patent is hereby corrected as shown below:

Column 22, line 46, insert -- $\rho/\rho\beta$ -- between "being" and "wherein";

line 47, delete "$\mu$" and insert -- $\rho$ --;

line 48, delete "$\mu$" and insert -- $\rho\beta$ --.

Signed and Sealed this

Fifth Day of December, 1989

*Attest:*

JEFFREY M. SAMUELS

*Attesting Officer*     *Acting Commissioner of Patents and Trademarks*